(12) United States Patent
Layher et al.

(10) Patent No.: US 7,713,111 B2
(45) Date of Patent: May 11, 2010

(54) WATER SUPPLY FOR A HAND-HELD POWER TOOL

(75) Inventors: Wolfgang Layher, Waiblingen (DE); Frank Berbig, Leipzig (DE); Georg Maier, Stetten (DE); Harald Mang, Winnenden (DE); Daniel Herbst, Karlsruhe (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 836 days.

(21) Appl. No.: 11/306,878

(22) Filed: Jan. 13, 2006

(65) Prior Publication Data

US 2007/0240313 A1 Oct. 18, 2007

(30) Foreign Application Priority Data

Jan. 17, 2005 (DE) ............. 10 2005 002 126

(51) Int. Cl.
*B24B 55/02* (2006.01)
*B24B 23/00* (2006.01)
(52) U.S. Cl. .................... 451/450; 125/13.01
(58) Field of Classification Search .......... 125/13.01, 125/11.22, 14; 83/62.1, 399, 478; 30/124; 451/358, 359, 450, 360
See application file for complete search history.

(56) References Cited

U.S. PATENT DOCUMENTS

| 1,664,983 | A | * | 4/1928 | Kimmel ............... 451/450 |
| 4,076,442 | A | * | 2/1978 | Cox et al. ............. 408/8 |
| 5,512,010 | A | | 4/1996 | Labad, Jr. |
| 5,826,478 | A | * | 10/1998 | Zerrer ............... 83/169 |
| 6,442,841 | B1 | | 9/2002 | Nilsson et al. ........ 30/123.3 |
| 6,546,631 | B2 | * | 4/2003 | Iida et al. ........... 30/124 |
| 6,591,826 | B1 | * | 7/2003 | Donnerdal ........... 125/13.01 |
| 6,857,939 | B2 | * | 2/2005 | Adachi et al. ........ 451/6 |
| 7,311,100 | B1 | * | 12/2007 | Siewers ............. 125/13.01 |
| 7,520,799 | B2 | * | 4/2009 | Wedel et al. ......... 451/450 |

FOREIGN PATENT DOCUMENTS

GB 2352997 A1 2/2001

* cited by examiner

*Primary Examiner*—Robert Rose
(74) *Attorney, Agent, or Firm*—Gudrun E. Huckett (57) ABSTRACT

A device for supplying water to a cutting wheel of a hand-held cut-off machine has a water-conducting line and a valve arrangement arranged in the line. The valve arrangement has a shut-off valve for controlling the water flow flowing through the line. The shut-off valve is actuated as a function of an operating signal of the cut-off machine such that in operation of the cut-off machine the water flow through the line is released by the shut-off valve. The shut-off valve interrupts the water flow through the line when the operating signal is absent.

19 Claims, 11 Drawing Sheets

WATER SUPPLY FOR A HAND-HELD POWER TOOL

BACKGROUND OF THE INVENTION

The invention relates to a water supplying device of a hand-held power tool, wherein the water supplying device comprises a water-conducting line and a valve arrangement arranged in the line and comprising a shut-off valve for controlling a water flow flowing through the line.

Hand-held power tools comprising a water supply through which, for example, cooling water is supplied to the tool of the power tool and/or to the workpiece are known. Particularly in the case of a hand-held cut-off machine, the cutting wheel can be supplied with water for binding dust produced when performing a cut.

The control or regulation of the supplied amount of water is not satisfactory in the known embodiments. By means of an external valve, the water flow can be released before beginning the work to be performed and can be interrupted after completion. After release of the water flow, the water flows to the location to be worked on even when the power tool is not in operation. Before and after the actual working steps as well as during short work interruptions, unwanted quantities of water escape that, in addition to increasing water usage, also compromise the location to be worked on with an unnecessary quantity of water.

U.S. Pat. No. 6,442,841 B1 discloses an arrangement with a device for supplying water to a hand-held power tool in which a shut-off valve for opening or closing a water line is provided. The shut-off valve is actuatable by means of a throttle trigger lock with which also the throttle trigger for adjusting the output of the drive motor can be released. By actuating the throttle trigger lock, a water supply is provided only when readiness to operate the working tool with power is indicated by releasing the throttle trigger.

A disadvantage of the disclosed arrangement is that water can escape when performing a function control of the actuating elements, in particular, of the throttle lock even without operation of the working tool, for example, when the motor is standing still. An adjustment of the conveyed amount of water is difficult as is the adjustment in regard to different water pressure available at the intake. Coupling the throttle lock to the shut-off valve leads to stiff operation. When the valve is dirty, stiff and/or damaged, the basic functions of the power tool, such as simple acceleration or performing a dry cut, are made difficult.

The invention has the object to provide a device for supplying water to a hand-held power tool that enables an improved adjustment of the conveyed quantity of water to the actual water demand.

SUMMARY OF THE INVENTION

In accordance with the present invention, the object is solved in that an actuation of the shut-off valve is provided as a function of an operating signal of the cut-off machine such that upon operation of the cut-off machine the water flow is released.

A device for supplying water to a hand-held power tool, in particular for supplying the cutting wheel of a cut-off machine, is proposed that comprises a valve arrangement with a shut-off valve arranged in a water-conducting line for controlling a water flow flowing through the line. An actuation of the shut-off valve depending on an operating signal of the power tool is provided in such a way that upon operation of the power tool the water flow is released and advantageously interrupted in the absence of the signal. The power tool can be prepared for the work to be performed wherein a water source can be connected and a valve adjustment can be carried out without an accidental water discharge. Operating elements of the power tool can be checked for free movability and starting attempts can be made without releasing the water flow. Only when the drive motor is actually running and/or a part of the power tool driven by the drive motor is being moved, an operating signal is generated whose presence is used as a control parameter for the shut-off valves and thus for release of the water flow. Only in this operating state a water flow for cooling the tool is actually required and is actually made available by the arrangement according to the invention. In the absence of the operating signal, i.e., when the power tool is standing still, the water supply is interrupted. An unnecessary discharge of water is prevented.

In an advantageous further embodiment, the shut-off valve is formed by a control valve for flow rate adjustment of the water flow. Depending on the characteristics of the operating signal, an engine speed-dependent quantity regulation can be carried out in addition to a simple on/off function, for example. Also, it is possible to provide a pre-adjustment for the aforementioned valve configuration by means of which the desired flow rate is pre-adjusted while, by means of the operating signal acting on the valve, the water flow is released in accordance with the pre-adjusted flow.

In an advantageous configuration the shut-off valve is a solenoid valve wherein an electric signal of the power tool is provided as an operating signal. The transmission of the electric operating signal is possible in a simple way by means of an appropriate cable wherein, in a simple way, electronic control logics can be integrated, for example. A solenoid valve has a simple configuration and can be positioned almost anywhere without consideration of mechanical factors.

Expediently, the operating signal is in particular the engine speed of a drive motor of the power tool which engine speed is determined by means of the ignition. It is possible to determine a limit speed above which the water flow is to be released. Below the same or a deviating, in particular lower, turn-off speed, the water flow is interrupted. The internal combustion engine can be started and operated at idle condition without water being discharged. At low engine speed it is also possible to carry out a dry cut before the water flow is released when increasing the engine speed. By selecting a lower turn-off speed a switching hysteresis results that avoids oscillations of the switching state within the limit speed range. The automatic switching action of the water supply can also be switched off. It is then possible to carry out an initial dry cut at a higher engine speed or even at maximum engine speed.

Advantageously, a control device with pulse width control is provided for the solenoid valve. While a simple constructive configuration of the valve and its magnetic drive are possible, it enables an effective flow rate control. In particular in combination with a memory for the selected adjustment of the pulse width control, the desired volume flow can be set and can be retrieved without readjustment for each individual cut.

For generating the electric supply voltage of the solenoid valve, a generator is expediently provided that can be small, lightweight, and simple in its configuration because of the minimal energy requirement of the solenoid valve. In particular it is possible that the electric supply voltage of the generator is provided as the operating signal for actuating the solenoid valve. After the starting process of the drive motor, the generator produces the desired supply voltage whose presence indicates that the power tool is operating. Additional control or switching elements are not required. It can also be advantageous to select the ignition voltage of the drive motor of an internal combustion engine as the operating signal. In this connection, the generator produces the supply voltage for actuating the solenoid valve. However, the actual actuation of the latter can be made dependent on the course of the ignition voltage, for example. In particular, with a suitable control logic the engine speed dependent ignition angle can be determined so that the electric operating signal is made available only upon reaching a predetermined minimum engine speed. As needed, the release of the water flow can be realized at the time partial or full load is reached while in idle operation the water flow is prevented.

In an expedient embodiment, an on/off switch for the electric operating signal is provided that is to be actuated by means of a part of the power tool that is moved in operation of the power tool. The on/off switch is advantageously embodied to be actuated by a magnetic clutch that is coupled to a part of the power tool rotated upon operation of the power tool or to be actuated by a vane that is exposed to the airflow of a fan wheel of the drive motor. By constructive adjustment of the magnetic clutch or the vane arrangement, a limit speed can be determined above which the water flow is released. The proposed arrangements are of a simple and reliable construction wherein the additional expenditure for electronic control logics is not required.

In an advantageous embodiment, the shut-off valve is a pneumatic valve wherein as an operating signal a pneumatic signal of the power tool is provided. As a pneumatic signal the underpressure in a vacuum pipe of the drive motor in the form of an internal combustion engine can be used. Expediently, the pneumatic operating signal is a crankcase pressure of a two-stroke internal combustion engine. Above a certain engine speed, the crankcase pressure can have a significant average value and optionally also pressure peaks. The high pressure level enables high adjusting forces at the pneumatic valve and thus a reliable actuation.

The pneumatic valve is preferably a diaphragm valve. The appropriate large-surface diaphragm enables in particular in connection with a lever mechanism correspondingly high adjusting forces with only minimal pressure difference being present. Minimal operating pressures can be sufficient for actuating the valve.

In an advantageous embodiment, the shut-off valve is a mechanical valve wherein a mechanical signal of a part of the power tool moved in operation of the power tool is provided as an operating signal. In particular, the mechanical valve is a centrifugal valve wherein the mechanical operating signal is the centrifugal force of a part of the power tool rotating in operation of the power tool. The centrifugal valve can be arranged, for example, on a fan wheel of the drive motor or the like and can be adjusted such that only upon reaching a predetermined engine speed the water flow is released while in idle condition water flow is prevented. Expediently, the centrifugal valve is arranged at the output side of a centrifugal clutch of the power tool and, in particular, is arranged in a hub of a cutting wheel of the cut-off machine. It is ensured in this way that the part rotating in operation is moved only above the limit speed at which the centrifugal clutch engages. The drive motor can first warm up in idle condition without an unwanted water quantity being discharged. At the beginning of the working process, the engine speed of the drive motor is increased to an operating speed where the centrifugal clutch engages and the working process can begin. The release of the water flow is thus coupled almost directly to performing the work to be done. Particularly when arranging the centrifugal valve in the hub of the cutting wheel, the water flow is released directly at the location of the tool to be cooled wherein the rotational movement of the cutting wheel and the centrifugal forces generated thereby enable a targeted water discharge to the cutting edge area without any loss.

In an advantageous configuration an injection nozzle of the centrifugal valve in the area of the hub, the water flow will flow as a result of the occurring centrifugal forces radially from the interior to the exterior so that the cutting wheel is wetted and cooled across its surface area. Throwing off a partial quantity of water that is ineffective for cooling purposes is thus prevented. A reliable cooling action can be produced in a water-saving way with only minimal flow rate.

The valve arrangement comprises advantageously a control valve comprising a valve body that is adjustable across a positioning travel. An opening cross-section of the control valve has in this connection a progressive characteristic line as a function of the positioning travel. By means of suitable actuating means the valve body can be moved into any position within its positioning travel so that a corresponding opening cross-section can be adjusted. The flow rate of the water flow is thus adjustable in accordance with demand. The progressive characteristic line enables, as needed, the connection of water sources at different pressure wherein the flow rate can be fine-adjusted with the same valve without additional devices. The progressive characteristic line is the cause for a significant positioning travel from the rest position of the valve body to a release of a comparatively minimal opening cross-section. In the case of a water supply at high pressure, for example, from a waterline network, the required water flow can be fine-adjusted. Alternatively, a water supply can be provided, for example, from a separate water container wherein the water container relative to the power tool is arranged at a certain height. The height difference between the water container and the power tool effects a static pressure that is sufficient for conveying water. The absolute quantity of the water pressure is however comparatively small. A fine control of the water flow with corresponding minimal pressure is possible by opening the control valve further wherein the progressive characteristic line within the limits of the preset positioning travel enables a correspondingly large opening cross-section. As a whole, by simple means and by elimination of switching devices or the like, the required supply rate can be adjusted precisely to the respective water demand relative to different pressure supplies.

In an advantageous embodiment, the control valve is designed such that the progressive characteristic line comprises at least two approximately linearly extending portions that are preferably progressively angled toward one another. A first, comparatively flat portion of the characteristic line is adjustable to a water supply at high pressure wherein the linear course enables a fine adjustment that has control characteristics that are predictable for the user. In the same sense, this is also true for the second, steeper characteristic line whose steepness enables in a simple way an adjustment to a low-pressure water supply, for example, comprised of a transportable container without pumps or the like.

The control valve is expediently configured as a globe valve with straight positioning travel. The configuration as a globe valve with linear actuation is not sensitive with regard to soiling and requires only minimal adjusting forces even at high water pressures while fulfilling corresponding seal tightness requirements.

The control valve is particularly designed such that the valve body is configured to have an opening action away from its rest position that is neutral relative to admission pressure of the water pressure at the supply side. The required actuating forces are at least approximately independent of the water pressure that is present. With an at least approximately constant actuating forces that can be sensed by the user an excellent adjustability of the water flow independent of the water pressure that is present is promoted.

In an expedient embodiment, in the valve arrangement the shut-off valve is serially connected in flow communication to the control valve wherein the control valve is provided for manual adjustment. By means of the control valve the desired water flow rate can be pre-adjusted while the shut-off valve, coupled to the operation of the power tool, can release the water flow or interrupt it as needed. The interruption of a working process leads in a desirable way to an interruption of the water flow. When taking up operation again, the water flow is released automatically without requiring that the water flow rate be adjusted anew.

The aforementioned variants can be constructed with simple means and can be designed such that an actuation of the connected valve takes place only at a certain engine speed. This engine speed can be adjusted such that idle or partial load operation is possible without triggering a water discharge. Automatic water discharge is realized only when a predetermined working speed is reached so that the water discharge is coupled directly and automatically to the act of performing the working process. Unnecessary water discharge is prevented.

BRIEF DESCRIPTION OF THE DRAWINGS

Embodiments of the invention will be explained in detail in the following with the aid of the drawing.

DESCRIPTION OF PREFERRED EMBODIMENTS

Figure 1:
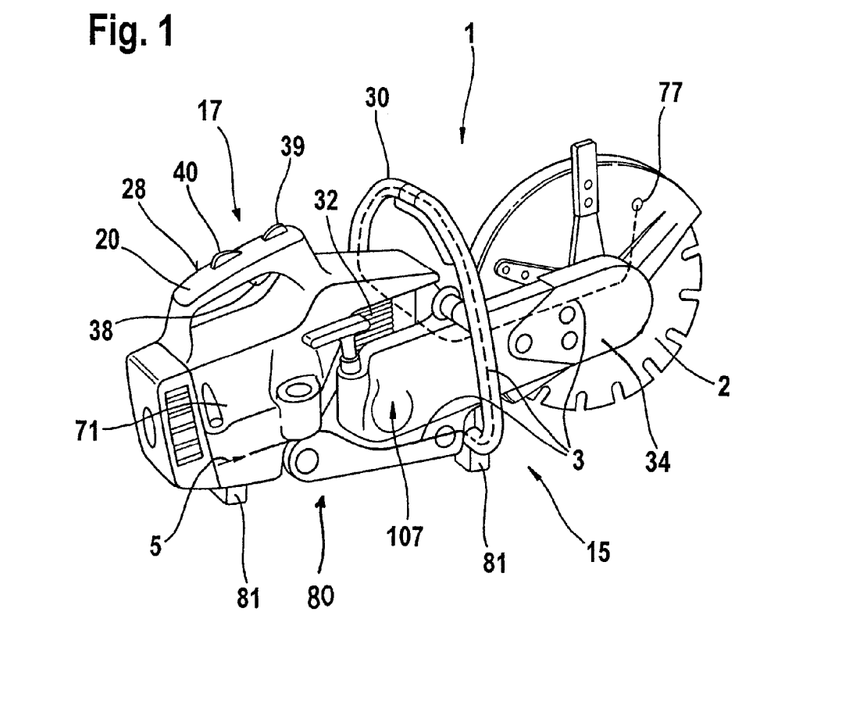
FIG. 1 is a perspective overview illustration of a power tool embodied as a cut-off machine with a device for supplying water.

FIG. 1 shows in a perspective overview illustration a power tool 1 exemplified by a hand-held cut-off machine. The cut-off machine has a drive motor 32 embodied as an internal combustion engine by means of which a cutting wheel 2 can be driven via a centrifugal clutch (not illustrated) and a belt drive 34. An electric generator 107 is connected to the drive motor 32 and generates electric energy when the drive motor 32 is running. The power tool can also be a power drill or another comparable hand-held power tool. The drive motor 32 can also be configured as an electric motor.

For guiding the power tool 1, a first handle 20 is provided on the handle housing 71 and a second handle 30 is provided that is positioned in front of the first handle 20 in the direction toward the cutting wheel 2. The second handle 30 is embodied in the illustrated embodiment as a grip pipe. The power tool 1 has a support surface 80 with support legs 81 for setting it down.

For actuating and for controlling the drive motor 32, a number of control elements 17 are provided of which a throttle trigger 38, a stop lever 39 as well as a throttle trigger lock 40 are arranged on the first handle 20.

For supplying water to the cutting wheel 2, the power tool 1 has a water supplying device 15 with which, as needed, a water flow 5 is conducted through a line 3 and a schematically illustrated injection nozzle 77 (shown in detail in FIG. 17) toward the cutting wheel 2. In the illustrated embodiment, the line 3 extends through the second handle 30 embodied as a grip pipe.

Figure 2:
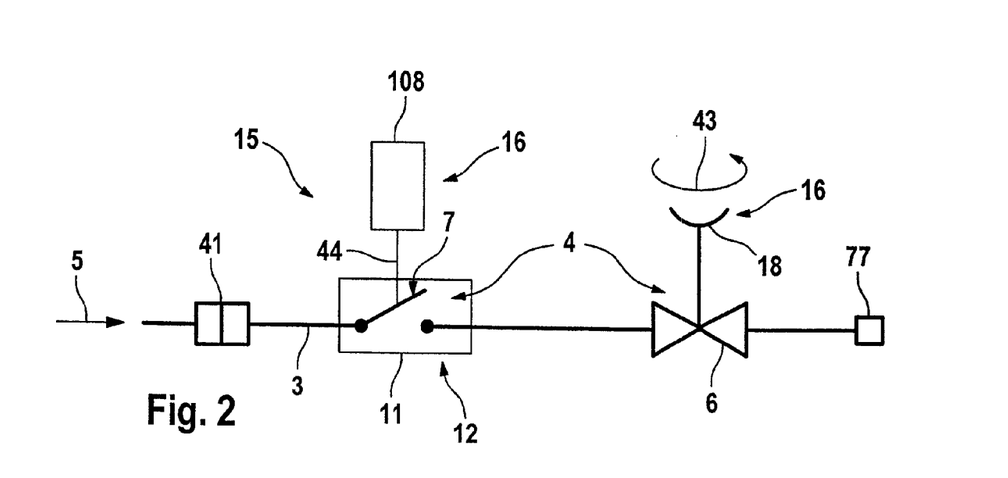
FIG. 2 is a schematic overview illustration of an embodiment of the water supply according to FIG. 1.

FIG. 2 shows in a schematic illustration an embodiment of the water supplying device 15 according to FIG. 1 with a valve arrangement 4 that comprises a control valve 6 and a shut-off valve 11 arranged in series upstream of the control valve 6. The control valve 6 and the shut-off valve 11 are arranged in the line 3 and are provided for controlling or adjusting the water flow 5. At the supply side of the line 3 a hose coupling 41 is provided with which, alternatively, a transportable water container or, by means of a hose, a pressurized waterline network can be connected.

The shut-off valve 11 has a valve body 7 (schematically illustrated) that is actuated by a push rod 44 by means of a solenoid switch 108. When the solenoid switch 108 is actuated by the presence of an operating signal received from the power tool 1 (FIG. 1), the valve body 7 is actuated so that the flow path through the valve 11 is released. The shut-off valve 11 together with the magnetic switch 108 and the push rod 44 form a solenoid valve 12 that is embodied preferably as a 2/2-way valve.

The operating signal for actuating the solenoid valve 12 is preferably an electric operating signal, for example, in the form of the electric voltage of the generator 107 (FIG. 1) or an ignition signal. Additional preferred operating signals for actuating the shut-off valve 11 can be a pneumatic signal, for example, in the form of the crankcase pressure or of the intake pressure of the drive motor 32 (FIG. 1) when the motor is running or a mechanical signal of a part of the power tool 1 that moves upon operation, in particular, in the case of a centrifugal clutch that engages based on engine speed. The electric operating signal can be in particular the presence of electrical energy from the generator 107 (FIG. 1) that is connected directly to the solenoid switch 108. When reaching a certain minimum engine speed, the electrical energy of the generator 107 is sufficient to actuate the solenoid switch 108 and to thus release the water flow 5.

Intermediate positions between an open position and a closed position of the shut-off valve 11 are not provided. Instead, the shut-off valve 11 is configured in the sense of an on/off function for releasing or interrupting the water flow 5.

The magnitude of the water flow 5 that is adjusted when the shut-off valve 11 is open is controllable by means of the control valve 6. For this purpose, a control element 18 is provided that acts on the control valve 6; in the illustrated embodiment, it is rotatable in the direction of arrow 43 so that the control valve 6 can be moved into any through flow position. The adjustment of the control valve 6 can be carried out in particular in the closed position of the shut-off valve 11 in which the control valve 6 is pressureless. In the open position of the shut-off valve 11 the water flow 5 flows at a flow rate that is predetermined by the position of the control valve 6 through the line 3. In this connection, the water flow 5 is supplied by means of the line 3 through injection valve 77 to the cutting wheel 2 (FIG. 1).

Figure 3:
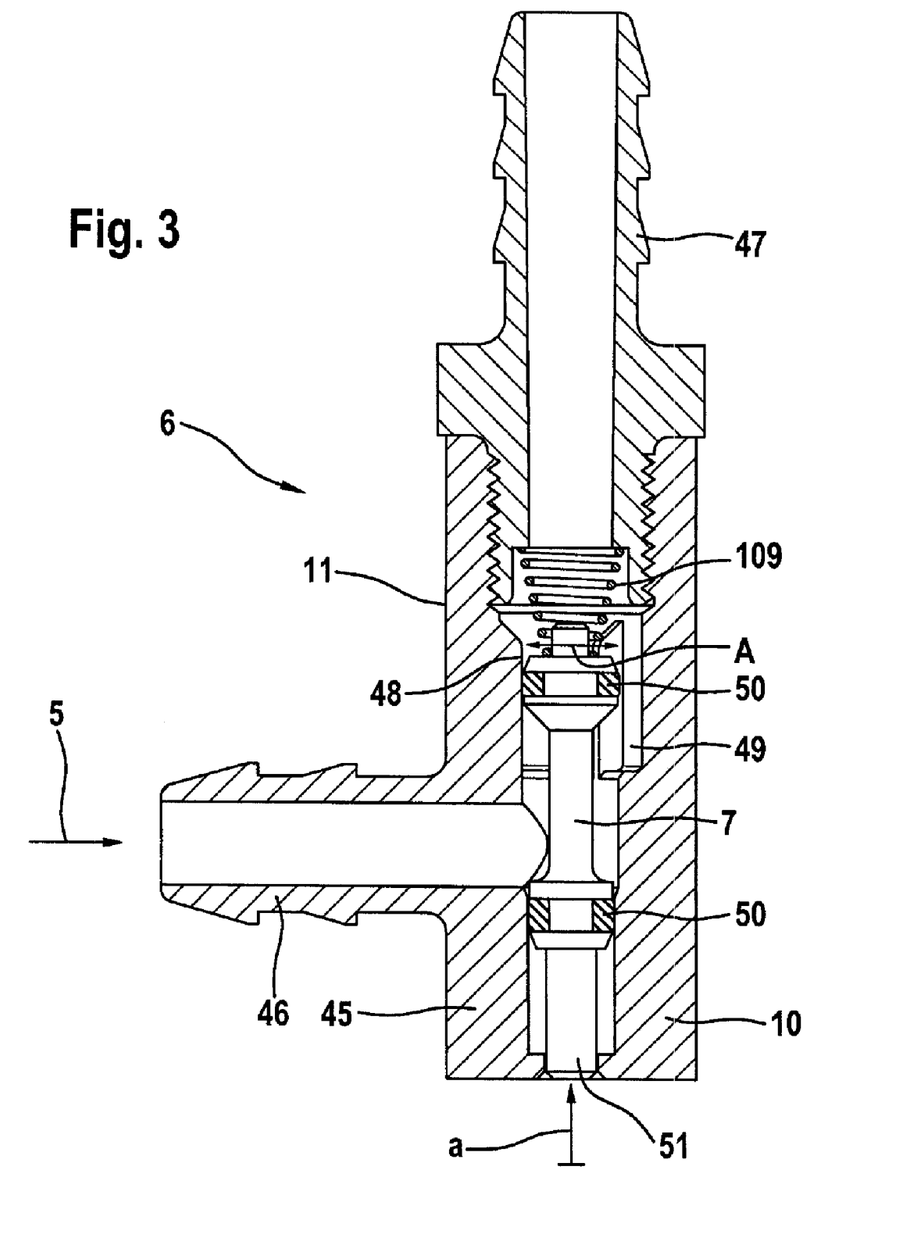
FIG. 3 is a longitudinal section illustration of a control valve that is embodied as a globe valve and is pressure-actuated.

In the illustrated embodiment, the control element 18 and the solenoid switch 108 are separate parts and enable independent actuation. The solenoid switch 108 and the control element 18 are part of an actuator 16 acting on the valve arrangement 4 and are independent of the additional control elements 17 (FIG. 1). FIG. 3 shows in a longitudinal section the control valve 6 according to FIG. 2 that is a globe valve 10 with a cylindrical valve seat 48 in the illustrated embodiment. The globe valve 10 comprises a valve housing 45 having a unitary intake nipple 46 positioned at a right angle to the longitudinal axis of the valve housing. An outlet nipple 47 is screwed into the valve housing 45 at the end face in the longitudinal direction. In the interior of the valve housing 45 the valve body 7 is arranged; it rests seal-tightly with two axially spaced apart sealing rings 50 radially outwardly against the cylindrical valve seat 48. On the end of the valve body 7 opposite the outlet nipple 47 a pressure pin 51 is provided that projects from the valve housing 45 in the unloaded state. By means of the pressure pin 51, the valve body 7 can be axially moved against the pretension of a pressure spring 109 away from its rest position by a positioning travel a. In the direction toward the outlet nipple 47, a radially extending depression is machined into the valve seat 48 for forming a valve opening 49 with a bent contour. When forcing the valve body 7 by means of the pressure pin 51 into the valve housing, the sealing ring 50 facing the outlet nipple 47 is moved into a position overlapping the valve opening 49. In this valve position, the water flow 5 can flow through the intake nipple 46 and the intermediate space between the two sealing rings 50 radially externally past the sealing ring 50 through the valve opening 49 and the outlet nipple 47. The contour of the valve opening 49 bent in the circumferential and radial directions is selected such that an opening cross-section A of the control valve 6 has a progressive characteristic line as a function of the positioning travel a.

Figures 4, 5:
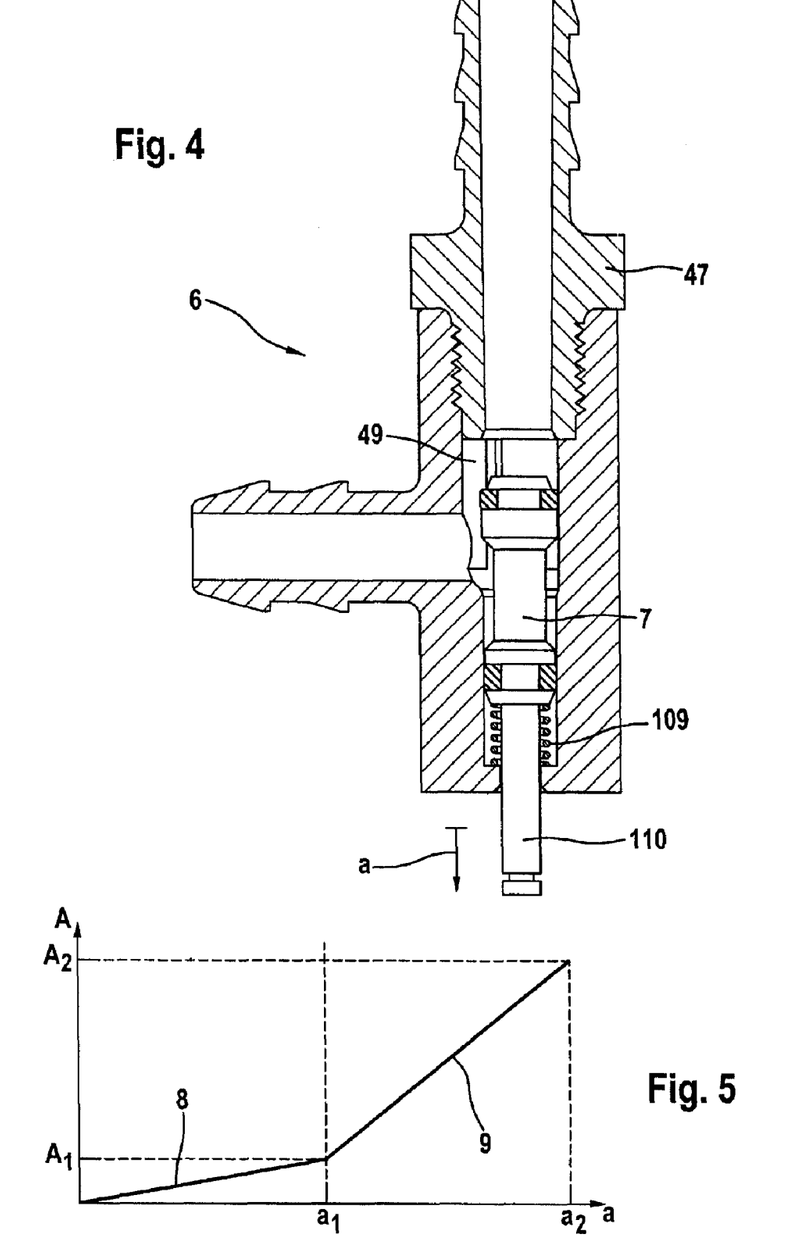
FIG. 4 is a variant of the valve according to FIG. 3 in an embodiment actuated by pulling action.
FIG. 5 is a diagram of the progressive characteristic line of the control valves according to FIGS. 3 and 4.

FIG. 4 shows another variant of the control valve 6 according to FIG. 3. The valve body 7 is pretensioned by means of pressure spring 109 in the direction toward the outlet nipple 47 and can be pulled against the pretensioning force of the pressure spring 109 by means of a tension pin 110 into the illustrated open position. The contour of the valve opening 49 is matched accordingly wherein, when free of tension load, the valve body 7 rests sealingly against the sealing seat of the outlet nipple 47. In regard to the remaining features and reference numerals, the illustrated configuration is identical to that of the control valve 6 according to FIG. 3.

The characteristic line of the opening cross-section A depending on the positioning travel a of the control valve 6 according to FIGS. 3 and 4 is illustrated in an exemplary fashion in the form of a diagram in FIG. 5. As shown, the progressive characteristic line comprises two at least approximately linearly extending portions 8, 9 that are progressively angled toward one another. The first portion 8 extends comparatively flat so that across a first positioning travel $a_1$—starting at the closed state—only minimal increase of the opening cross-section $A_1$ results. The second portion 9 of the characteristic line adjoins the first portion 8 at an angle so that upon further actuation of the valve body 7 up to a positioning travel $a_2$—because of the steeper course of the portion 9—a greater increase of the opening cross-section A up to the maximum opening cross-section $A_2$ results. It can be expedient to provide a curved progressive extension of the characteristic line.

In the embodiment according to FIGS. 3 and 4, the valve body 7 is guided along a straight positioning travel a. It is also possible to provide a configuration for producing the progressive characteristic line (FIG. 5) where the valve body 7 is guided in a rotatable or pivotable way.

In the embodiment according to FIG. 3, the rest position of the valve body 7 is selected such that the sealing ring 50 in the area of the valve opening 49 rests about its entire circumference seal-tightly against the valve seat 48 and in this way interrupts the water flow 5 completely. The illustrated globe valve 10 is configured as a control valve 6 for adjusting the flow rate as well as a shut-off valve 11 for interrupting or releasing the water flow 5. Also, an arrangement can be expedient where the positioning travel a is adjusted such that the flow volume passing through is adjusted to be greater or smaller wherein a shut-off function is assigned to a separate shut-off valve 11.

The two sealing rings 50 and the valve seat 48 externally surrounding them have an approximately uniform diameter. In the case of water pressure loading at the supply side through the intake nipple 46, the pressure forces acting in both axial directions on the valve body 7 compensate one another at least approximately. The actuating forces to be applied onto the pressure pin 51 or the tension pin 110 are essentially independent of the water pressure that is present. The valve body 7 is designed such that its opening action away from its illustrated rest position is neutral relative to the admission pressure of the water pressure at the supply side. Closing of the valve body 7 can be realized, for example, actively by applying a pressure or tension force with or without support being provided by pressure spring 109. A construction can also be expedient where flow through the globe valve 10 is directed in the opposite direction. The water pressure that is acting at the supply side on the valve body 7 loads the valve body 7 with a closing force against which the valve body 7 is to be opened away from its rest position; the pressure-caused closing force leads, as needed, to an automatic closing of the valve body 7.

Figure 6:
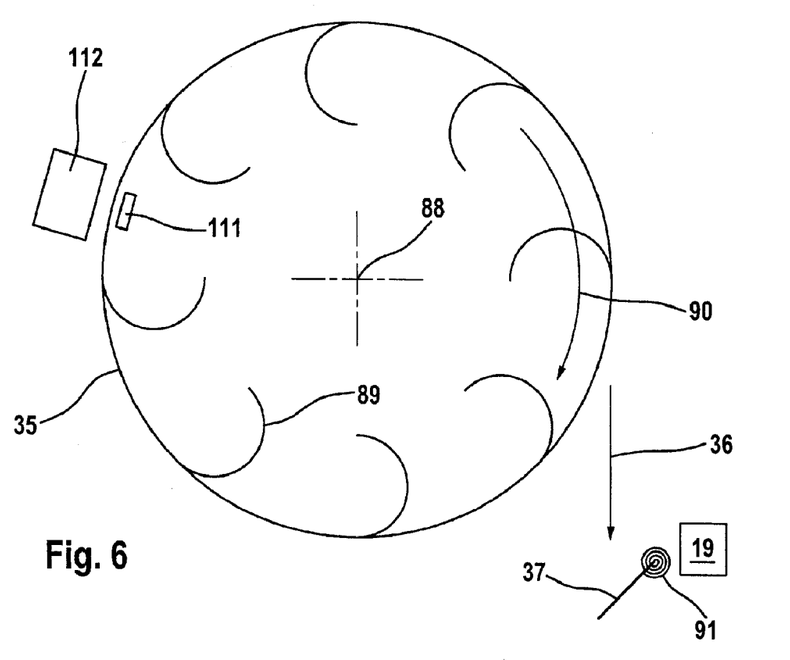
FIG. 6 is a schematic illustration of a fan wheel with an ignition device as well as a vane loaded by an air flow for actuating an on/off switch.
Figure 7:
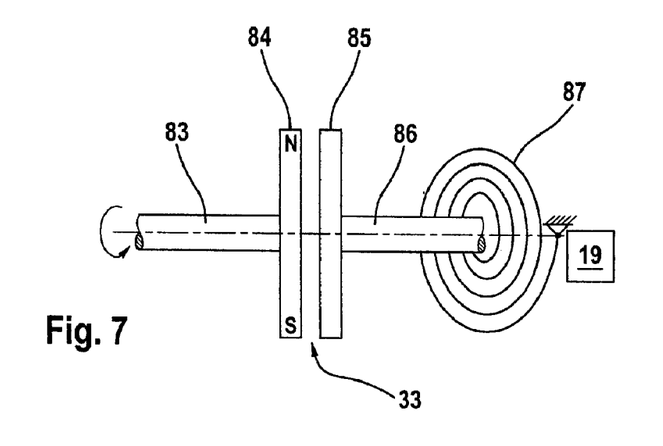
FIG. 7 is a schematic illustration of a magnetic clutch as a part of an on/off switch.

FIGS. 6 and 7 show in schematic illustrations embodiments in which an electric operating signal is generated by a part of the power tool 1 (FIG. 1) that is moved in operation.

According to FIG. 6, an embodiment is provided in which the power tool 1 in operation generates an airflow 36. In the illustrated embodiment, a fan wheel 35 of the drive motor 32 (FIG. 1) is provided that, together with the schematically illustrated vane configuration 89, can be driven in rotation in the direction of arrow 90 about an axis of rotation 88. The airflow 36 for cooling the drive motor 32 is generated as a result of the rotational movement. The vane 37 is exposed to the airflow 36. The vane 37 is supported to be pivotable against the restoring moment of a spiral spring 91 so that by means of the vane 37 a schematically illustrated on/off switch 19 can be actuated. The actuation of the on/off switch 19 is coupled to the operation of the power tool 1 (FIG. 1) or to a part (fan wheel 35) moved upon operation of the power tool so that an operating signal of the power tool 1 is provided upon reaching a certain minimum engine speed. The generator 107 then generates electric power that can be supplied by means of the on/of switch 19 to the solenoid switch 108 or the solenoid valve 12 (FIG. 1).

The illustrated fan wheel 35 is also part of an electric ignition device for the drive motor 32 (FIG. 1). The fan wheel 35 for this purpose supports in the area of its circumference at least one magnet 111 that passes an ignition coil 112 secured to the housing. It is also possible to provide additional magnets 111. When guiding the magnet 111 past the ignition coil 112, an electric ignition voltage is induced that can be used optionally also as an electric operating signal. When an ignition voltage is present, the solenoid switch 108 or the solenoid valve 12 (FIG. 2) can be actuated by means of appropriate control logics and the water flow 5 can be released in this way.

In the embodiment according to FIG. 7, an on/off switch 19 can be actuated as a function of a part that rotates upon operation of the power tool 1 and is coupled to a solenoid clutch 33. Instead of the solenoid clutch it is also possible to employ an eddy current clutch, an eddy current brake, or similar devices. The part that rotates in operation is, for example, a shaft 83 that can be a crankshaft of the drive motor 32 or a bearing shaft of the cutting wheel 2 (FIG. 1). A magnet 84 is provided on the shaft 83 and is rotated at a spacing past an iron plate 85. The iron plate 85 is pivotably supported on a shaft 86 against the restoring moment of a spiral spring 87. When a constructively predetermined speed of the magnet 84 is reached, a suitable pivot moment is transmitted onto the iron plate 85; this is sufficient for actuating the indicated on/off switch 19. As a function of the operation-caused actuation of the on/off switch 19, the solenoid switch 108 or the solenoid valve 12 (FIG. 2) is released.

Figure 8:
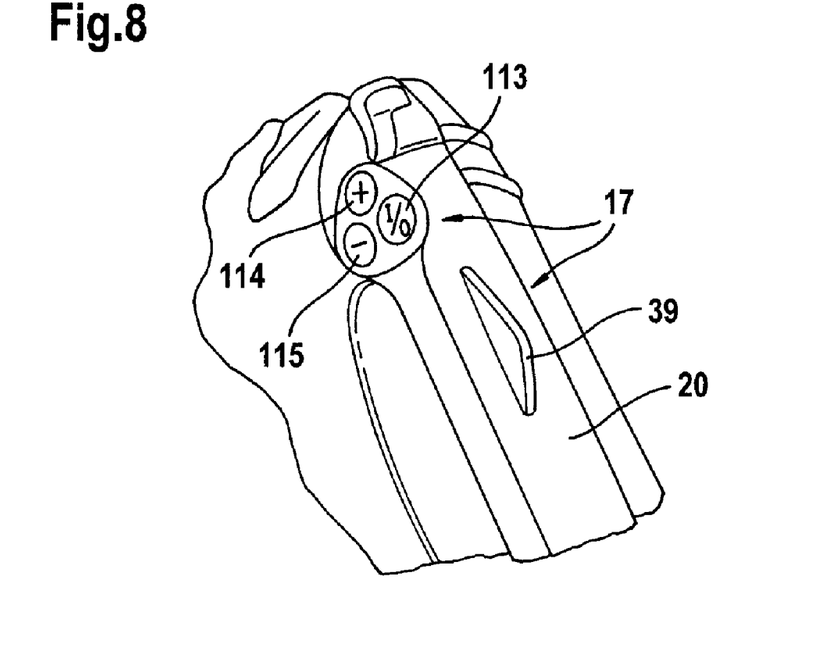
FIG. 8 is a perspective illustration of a handle arrangement of the power tool according to FIG. 1 with laterally arranged push buttons for actuating the valve arrangement according to FIG. 2.

FIG. 8 shows in a perspective view the area of the first handle 20 of the power tool 1 according to FIG. 1. The control elements 17 comprise in addition to the illustrated stop lever 39 also three push buttons 113, 114, 115 which are arranged in a triangular configuration relative to one another. The push button 113 is provided for controlling the solenoid valve 12 according to FIG. 2 in such a way that the solenoid switch 108 in the switched-on state can act as disclosed in connection with FIG. 2. By means of the push button 113 the solenoid switch 108 according to FIG. 2 can also the switched off so that, despite the presence of an electric operating signal, the solenoid valve 12 does not open. In this state, the power tool 1 according to FIG. 1 can be used to perform a dry cut, for example. By means of the two additional push buttons 114, 115, the control valve 6, for example, according to FIGS. 2, 3, or 4 can be controlled such that the amount of water passing through is increased or decreased in the open state.

Figure 9:
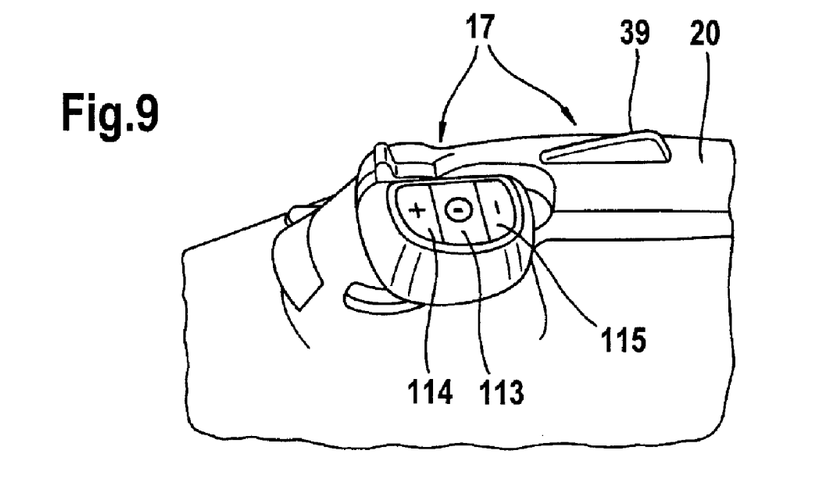
FIG. 9 is a variant of the arrangement according to FIG. 8 with the push buttons arranged in a row.

FIG. 9 shows another configuration of the arrangement of FIG. 8 according to which the push button 113 for controlling the on/off function is arranged centrally between the two push buttons 114, 115 for increasing or decreasing the flow rate. In regard to the remaining features and reference numerals, the illustrated embodiment is identical to that of FIG. 8.

Figure 10:
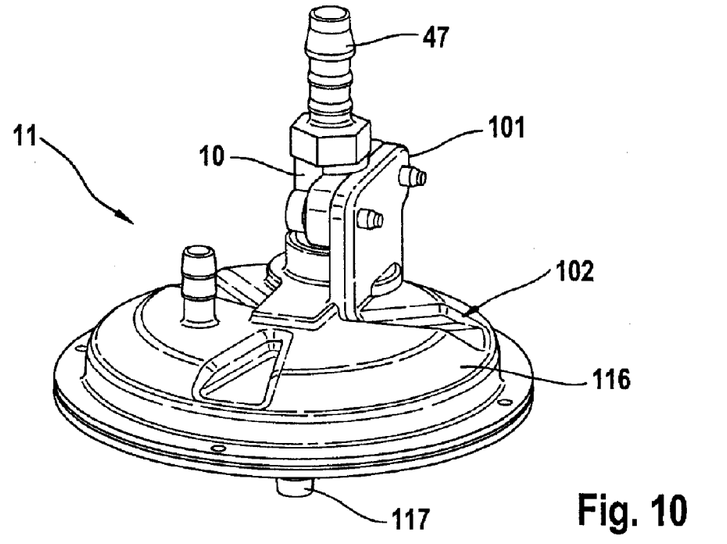
FIG. 10 is a perspective illustration of a diaphragm valve with pressure cell.

FIG. 10 shows in a perspective overview illustration an embodiment of the shut-off valve 11 that is embodied as a pneumatic valve 101. The pneumatic valve 101 can be embodied in a configuration in which a control piston can be loaded as needed by a control pressure.

In the illustrated embodiment the pneumatic valve 101 is a diaphragm valve 102 that comprises a pressure cell 116 as well as a globe valve 10 according to FIG. 3. The pressure cell 116 is provided with a pressure connector nipple 117 through which the pressure cell 116 can be loaded with the crankcase pressure of the drive motor 32 (FIG. 1) that is configured as an internal combustion engine. The crankcase pressure that is generated when the internal combustion engine 32 is running provides the pneumatic operating signal of the power tool 1 (FIG. 1). Upon the presence of the pneumatic operating signal, the pressure cell 116 acts on the globe valve 10 in a way described in detail in connection with FIG. 11 such that the water flow through the outlet nipple 47 is released.

Figure 11:
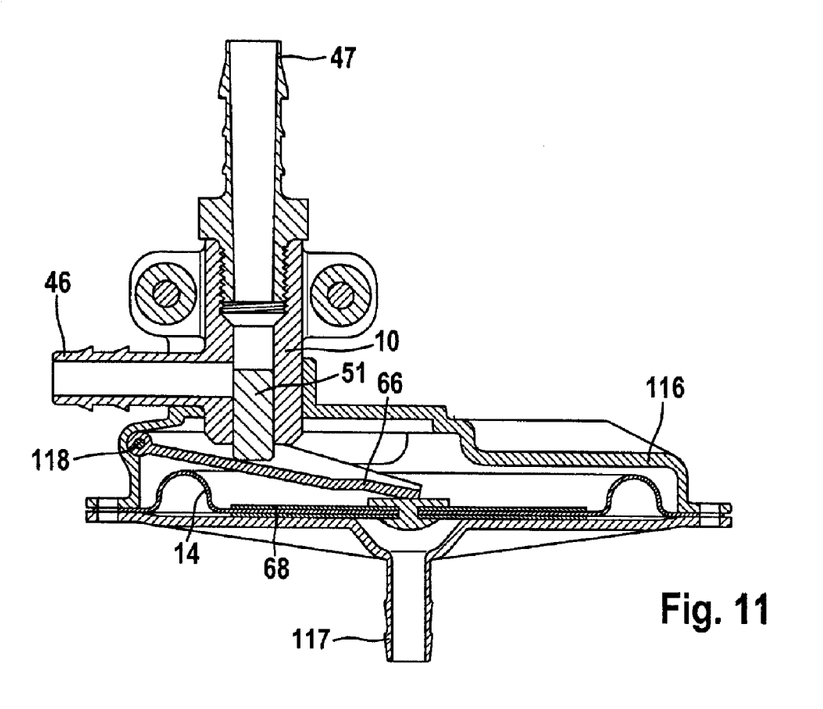
FIG. 11 is a section illustration of the arrangement according to FIG. 10.

FIG. 11 shows a section illustration of the arrangement according to FIG. 10, according to which the globe valve 10 of FIG. 3 is screwed onto the pressure cell 116 such that the pressure pin 51 projects into the interior of the pressure cell 116. The pressure pin 51 and the outlet nipple 47 are positioned axis-parallel to the pressure connector nipple 117 and perpendicularly to a diaphragm 14 of the pressure cell 116.

The pressure cell 116 is divided internally by means of the diaphragm 14 into two partial chambers wherein the first partial chamber is correlated with the pressure connector nipple 117 and the second partial chamber is correlated with the pressure pin 51. The diaphragm 14 supports a pressure plate 68 that acts onto a lever 66 that is supported within the interior of the pressure cell 116 so as to be pivotable about the pivot axis 118. The lever 66 rests with its free end against the pressure plate 68 and has a shorter lever area relative to the pivot axis 118 that rests against the pressure pin 51. In this way, a lever action results between the pressure-caused deflection of the diaphragm 14 and the defection of the pressure pin 51 in such a way that the large pressure-loaded surface of the diaphragm 14 in connection with the leverage leads to great adjusting forces acting on the pressure pin 51. With comparatively minimal pressure differences acting on the diaphragm 14, high actuating forces acting on the pressure pin 51 can be generated.

Figure 12:
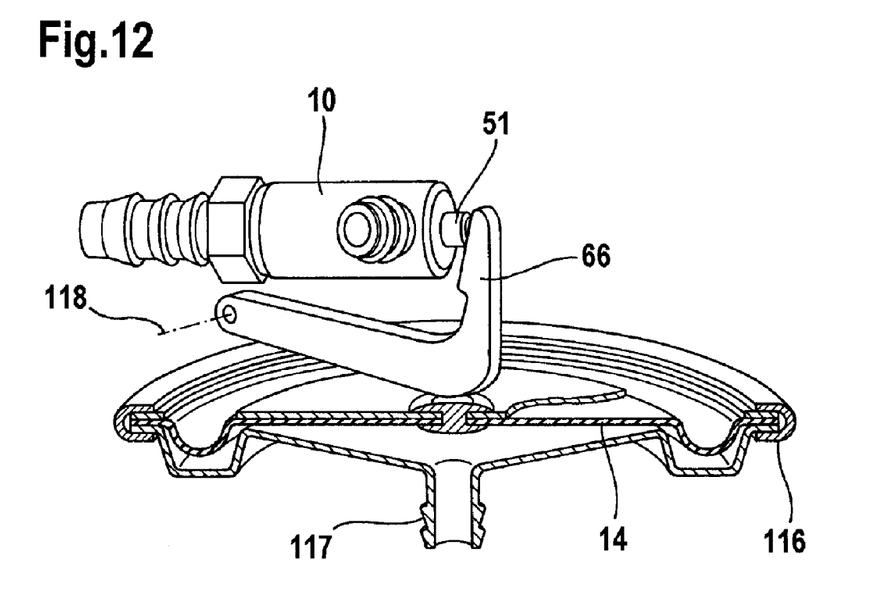
FIG. 12 is a partially sectioned overview illustration of an embodiment of a diaphragm valve with a conically slanted plunger acting on the shut-off valve.

FIG. 12 shows in a partially sectioned perspective illustration a variant of the arrangement according to FIG. 11 in which the globe valve 10 is positioned approximately parallel to the surface of the diaphragm 14. The lever 66 that is pivotable about the pivot axis 118 is angled such that the leg that is perpendicular to the plane of the diaphragm 14 acts on the pressure pin 51. The pressure cell 116 is open on the side that is facing the lever 66 or the globe valve 10 and loaded by atmospheric pressure. The crankcase pressure that is present acts on the opposite side that is facing the pressure connector nipple 117.

Figure 13:
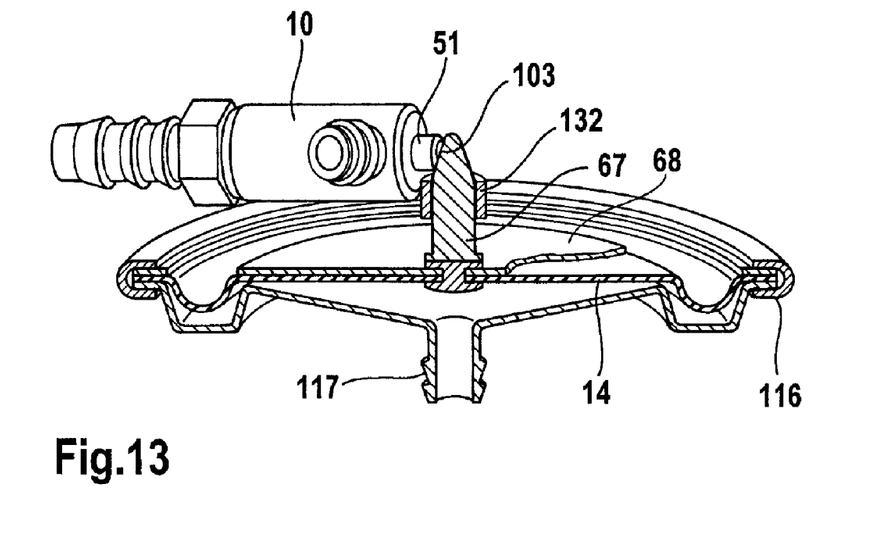
FIG. 13 is a variant of the arrangement according to FIG. 12 with a lever arranged between the diaphragm and the shut-off valve.

According to FIG. 13 a variant of the embodiment according to FIG. 12 is provided in which centrally on the pressure plate 68 or the diaphragm 14 a plunger 67 is provided that is perpendicular to the plane of the diaphragm 14 and axis-parallel to the pressure connector nipple 117. The plunger 67 is guided in its axial direction by means of a guide sleeve 132 and has at its free end a slanted surface 103. The slanted surface 103 contacts the pressure pin 51 of the horizontally arranged globe valve 10, wherein the pressure pin is pretensioned by a spring. Upon axial deflection of the plunger 67 caused by a pneumatic operating signal, the slanted surface 103 performs a gliding movement on the pressure pin 51 so that the pressure pin 51 is pressed inwardly and the water flow through the globe valve 10 is released.

Figure 14:
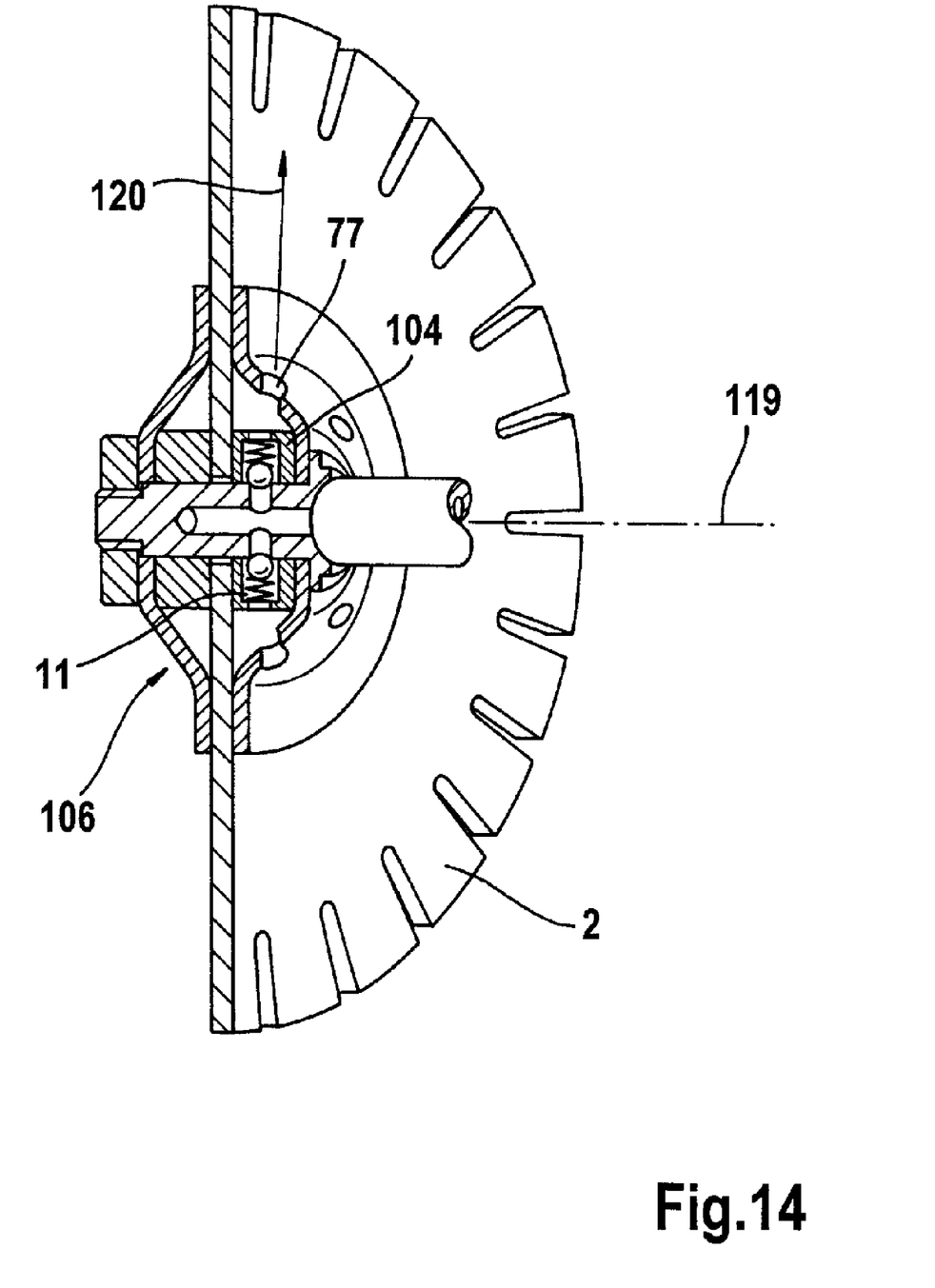
FIG. 14 is a basic illustration of a partially sectioned view of a centrifugal valve in the hub of a cutting wheel.

A further embodiment of the shut-off valve 11 embodied as a mechanically operating valve 104 is illustrated in FIG. 14. The mechanical valve 104 is arranged in a hub 106 of the cutting wheel 2; the hub has about its circumference several injection nozzles 77.

As an operating signal for actuating the mechanical valve 104, a mechanical signal in the form of a centrifugal force of the part of the power tool 1 (FIG. 1) that moves upon operation of the power tool is provided wherein in the illustrated embodiment the part is the cutting wheel 2. Upon operation-caused rotation of the cutting wheel 2 about its axis of rotation 119, the mechanical valve 104 opens and releases the water flow through the injection nozzles 77. The discharged water runs across the surface of the cutting wheel 2 in the radial direction that is indicated by arrow 120.

Figure 15:
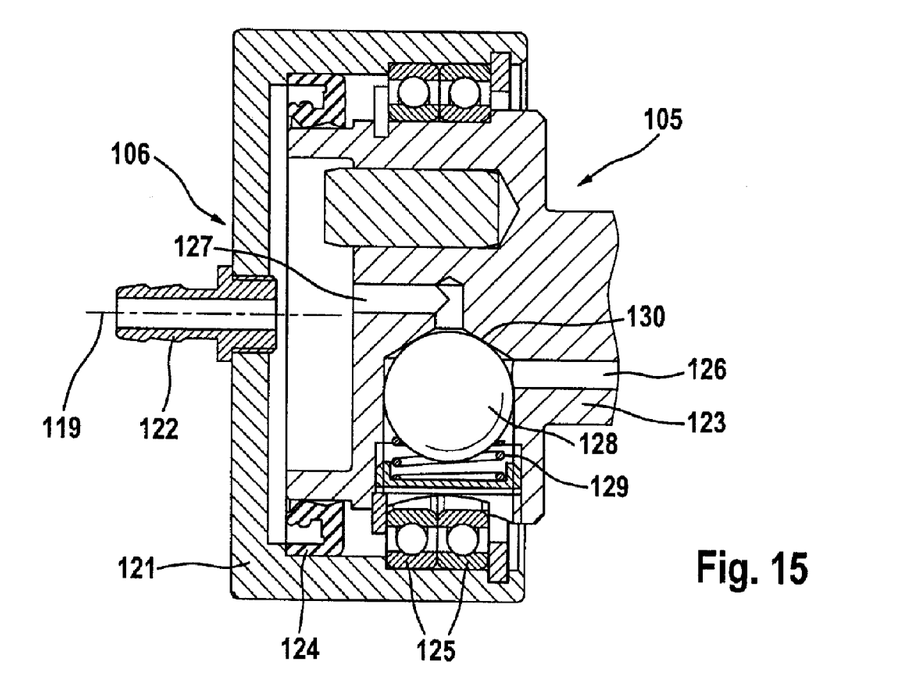
FIG. 15 is a section view of an embodiment of a centrifugal valve according to FIG. 14 with a radially pre-tensioned valve body.
Figure 16:
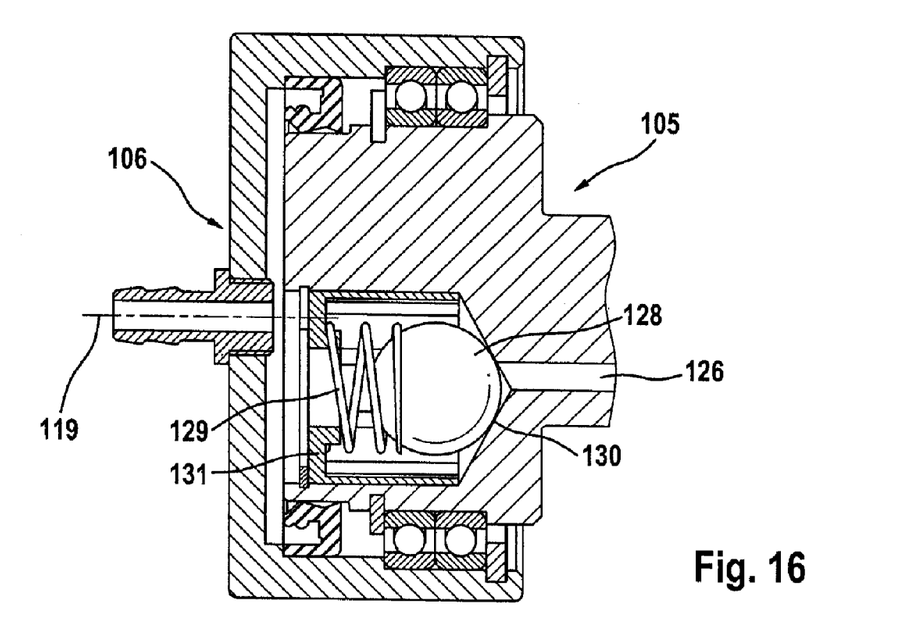
FIG. 16 is a variant of the arrangement according to FIG. 15 with axially pretensioned valve body.

Different embodiments of the mechanical valve 104 according to FIG. 14 in the form of a centrifugal valve 105 are illustrated in the section views of FIGS. 15 and 16.

In the embodiment according to FIG. 15, the centrifugal valve 105 is integrated into the hub 106. The hub 106 comprises a hub housing 121 in which a connecting nipple 122 is arranged coaxially to the axis of rotation 119. In the hub housing 121 connected to the power tool a valve base member 123 is rotatably supported by means of two ball bearings 125 wherein the valve base member 123 rotates together with the cutting wheel 2 (FIG. 14). The valve base member 123 is sealed by means of a circumferential sealing ring 124 against the inner side of the hub housing 121. In the central area of the valve base member 123, an angled supply bore 127 is provided that opens into a conically configured sealing seat 130. The ball 128 is pressed by means of a pressure spring 129 against the conical sealing seat 130 in the radial direction from the exterior to the interior. The ball 28 that is arranged radially outside of the axis of rotation 119 acts as a centrifugal member that, above a predetermined engine speed, is deflected radially outwardly against the pretension of the pressure spring 129 and in this way is lifted off the sealing seat 130. When this occurs, a flow-conducting connection of the supply bore 127 to the discharge bore 126 is provided. Water flows through the connecting nipple 122, the supply bore 127, and the discharge bore 126 to the injection nozzles 77 according to FIG. 14. The sealing ring 124 prevents the water flow from exiting through the area of the ball bearing 125.

In the embodiment according to FIG. 16, the ball 128 is positioned radially off center relative to the axis of rotation 119 and is secured in a sleeve 131. The inner diameter of the sleeve 131 is greater than the outer diameter of the ball 128 so that a radial movability and also an axial movability of the ball 128 results. The pressure spring 129 is arranged in the axial direction and pretensions the ball 128 in the axial direction against a correspondingly aligned conical sealing seat 130. A discharge bore 126 opens into the sealing seat 130. Above a predetermined limit speed the ball 128 that is pretensioned in the axial direction can deflect in the radial direction by rolling or gliding on the conical sealing seat. Because of the conical shape of the sealing seat 130, the ball 128 is subjected to a combined radial and axial displacement that is counteracted by the pretension of the pressure spring 129. In the deflected state of the ball 128, the discharge bore 126 is released and water flow is enabled. In regard to other features and reference numerals, the illustrated arrangement is identical to that of FIG. 15.

Figure 17:
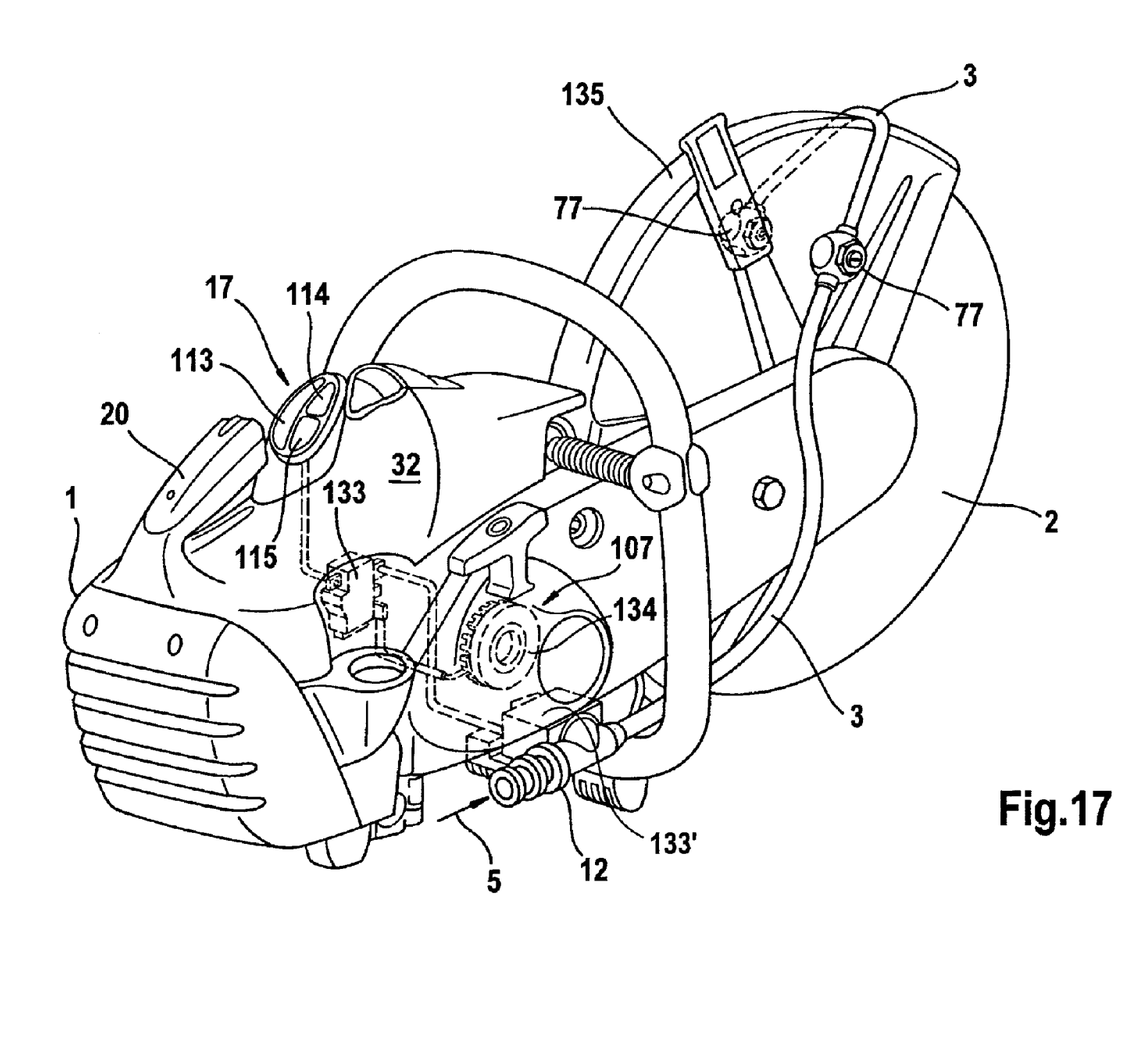
FIG. 17 is a perspective overview illustration of a cut-off machine with a solenoid valve and a control device actuated depending on engine speed.

FIG. 17 shows in a perspective overview illustration a further embodiment of a power tool 1 in the form of a cut-off machine with a solenoid valve 12 and a control device 133.

In the housing of the power tool 1, a drive motor 32, not illustrated in detail, in the form of an internal combustion engine is arranged; in addition to the cutting wheel 2 it drives also a generator 107. A generator wheel 134 of the generator 107 is illustrated; the generator wheel is rotated by the crankshaft of the drive motor 32 and induces an operating voltage. In the illustrated embodiment, the generator wheel 134 is arranged directly on the crankshaft (not illustrated) of the drive motor 32 between its crank drive and the centrifugal clutch (also not illustrated).

In the housing of the power tool 1 the control device 133 is arranged that is supplied by the generator 107 with the operating voltage when the drive motor 32 is operating. It can also be expedient to integrate the control device 133 into the solenoid valve 12 as indicated and illustrated in FIG. 17 as control device 133'. The control device 133 detects the operating signal of the power tool 1 and controls as a function of this operating signal the solenoid valve 12 such that the water flow 5 through the valve is released when the operating signal is present and is interrupted when such operating signal is absent. The presence of the operating voltage of the generator 107 can be selected as the operating signal of the power tool 1, for example. In the illustrated embodiment, the control device 133 detects by means of an ignition (not illustrated) of the drive motor 32 the engine speed n as an operating signal (this will be explained in connection with FIG. 18).

The rear handle 20 is illustrated partially interrupted in order to show the position of the control element 17 arranged on the housing of the power tool 1. The control element 17 comprises a total of three push buttons 113, 114, 115 and is connected to the control device 133. The control device 133 comprises control and memory means. The control means for the valve 12 provide a pulse width control of the solenoid valve 12. In this connection, the valve 12 is opened and closed in accordance with short pulses. As a function of the selected pulse width, an adjustable average opening duration and thus an adjustment of the water flow 5 as a pre-selectable flow volume can be determined. By actuating the button 114, the opening pulse duration of the solenoid valve 12 is extended and therefore the flow volume increased. By actuating the push button 115, a change in the opposite direction takes place. By means of the push button 113 the possibility of switching between the operating signal-dependent release of the water flow and a permanent interruption of the water flow is provided. The selections made by means of the buttons 113, 114, 115 are stored in the memory that is integrated into the control device 133. When starting the power tool 1 again, the pulse width control of the control device 113 is set to the last selected operating state.

By means of the push buttons 114, 115, the flow volume of the water during operation or during running of cutting wheel 2 can be adjusted. Also, for carrying out a dry cut, the water discharge can be interrupted by actuation of the button 113. When subsequently actuating the buttons 114, 115, the water flow is released again.

It is also possible to actuate the buttons 114 or 115 in idle operation of the drive motor 32. In this way, for a short duration the solenoid valve 12 or the water flow 5 is released and switched off again after approximately 8 seconds, for example. This enables the adjustment and control of the flow volume in idle operation when the cutting wheel 2 is standing still or when the operating signal is absent. In the case of a voltage supply of the control device 133, for example, by means of a battery or an accumulator, such a pre-adjustment or control can also be realized when the drive motor 32 is standing still.

The cutting wheel 2 is partially covered by cover 135. The cover 135 is provided on both sides with an injection nozzle 77 that is connected by means of lines 3 in a flow-conducting way to the valve 12. In particular for pulse width-controlled opening of the solenoid valve 12, the water flow 5 is released, adjusted with regard to its quantity, and conveyed to the injection nozzles 77 from where it is injected onto both sides of the cutting wheel 2.

Figure 18:
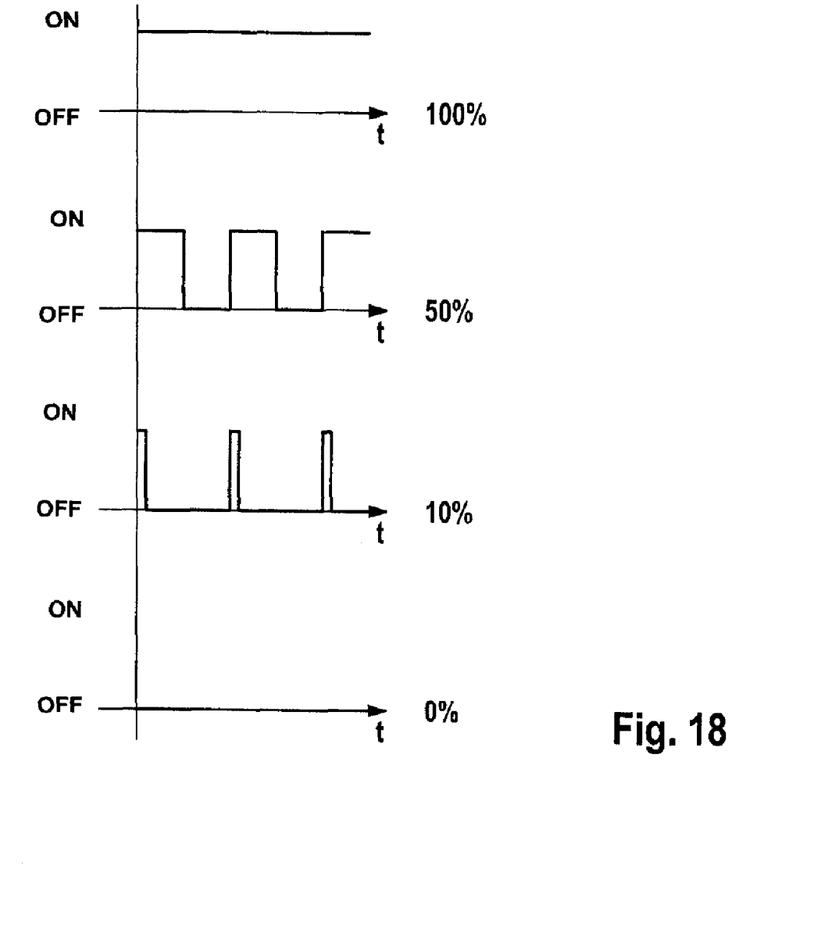
FIG. 18 is an exemplary switching diagram of the control device according to FIG. 17 with pulse width modulation for regulating quantity.

The aforementioned pulse width modulation for flow rate control is illustrated in the diagram of FIG. 18 according to which two switching states "ON" and "OFF" are shown as a function of time t. In the two switching states, the valve 12 (FIG. 17) is completely open or closed. Intermediate states are not provided and result only for short periods of time during the switching process. In the case of a pre-adjusted full water flow (100%), the valve 12 (FIG. 17) is permanently in the position "ON" while for a reduced adjusted water flow (for example, 50% or 10%) it is switched between the two switching states "ON" and "OFF" in an oscillating fashion. The switching frequency can be, for example, approximately 10 Hz and remains the same for different water flows. The adjustment of the water flow results from the percentage of the duration of the switching states "ON" relative to the total switching cycle; in the illustrated embodiments, this is 50% or 10%. For interrupted water supply, this portion is 0%; the valve 12 (FIG. 17) is permanently closed.

Figure 19:
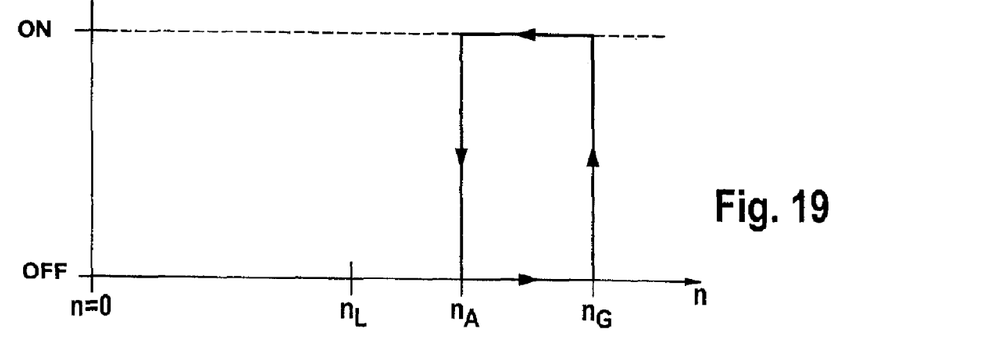
FIG. 19 is an exemplary switching diagram of the control device according to FIG. 17 with switching hysteresis when turning on and off.

FIG. 19 shows in a diagrammatic illustration the engine speed-dependent course of switching the control device 133 according to FIG. 17 on and off; the two switching states "ON" and "OFF" are shown as a function of the engine speed n. When the drive motor 32 (FIG. 17) is standing still, i.e., it is engine speed is n=0, or when at idle speed $n_L$, the solenoid valve 12 is closed, i.e. in the position "OFF". The engine speed n as the operating signal of the power tool 1 is detected and evaluated in particular based on the ignition of the drive motor 32. Upon reaching a predetermined limit speed $n_G$, for example, 4000 per minute, the valve 12 switches to the "ON" position. Upon further increase of the engine speed n, it remains in this position.

The switching logics programmed into the control device 133 provide a hysteresis according to which turn-off speed $n_A$ is provided that is lower than the limit speed $n_G$. When the engine speed n drops below the limit speed $n_G$, the control valve 12 remains initially in the position "ON" and closes only below the lower turn-off speed $n_A$.

At the beginning of the cutting process, an engine speed can be selected that is minimally below the limit speed $n_G$ at which the cutting wheel 2 is already rotating. A dry cut or an approach to the cutting position that is not impaired by water flow can be realized. Subsequent to the fine adjustment of the power tool 1 or to performing the dry cut, the engine speed n is increased past the limit speed $n_G$ so that the water flow 5 (FIG. 17) is released. Load-caused engine speeds n in the range about the limit speed $n_G$ for a short-term and minimal drop below the limit speed $n_G$ do not lead immediately to the water flow 5 being switched off. This occurs only when the engine speed n is lowered to a value below the turn-off speed $n_A$.

While specific embodiments of the invention have been shown and described in detail to illustrate the inventive principles, it will be understood that the invention may be embodied otherwise without departing from such principles.

What is claimed is:

1. A device for supplying water to a hand-held power tool, the device comprising:
   a water-conducting line;
   a valve arrangement arranged in the line and comprising a shut-off valve for controlling a water flow through the line;
   wherein the shut-off valve is automatically actuated in direct functional dependency on a rotary speed of an operationally rotated part of the power tool which part is caused to rotate in operation of the power tool, wherein in operation of the power tool the water flow through the line is automatically released by the shut-off valve above a limit speed of the rotary speed of the operationally rotated part and is automatically interrupted by the shut-off valve below a turn-off speed of the rotary speed of the operationally rotated part.

2. The device according to claim 1, wherein the shut-off valve is a control valve that adjusts a flow rate of the water flow through the line.

3. The device according to claim 1, wherein the shut-off valve is a solenoid valve and the operationally rotated part generates an electric signal for actuating the solenoid valve.

4. The device according to claim 3, further comprising a control device connected to the solenoid valve, wherein the control device controls the solenoid valve by pulse width control.

5. The device according to claim 4, wherein the control device has a memory for a selected adjustment of the pulse width control.

6. The device according to claim 3, further comprising a generator generating an electric supply voltage for the solenoid valve, wherein the electric supply voltage of the generator is the electric signal for actuating the solenoid valve.

7. The device according to claim 3, wherein the electric signal is an ignition voltage of an internal combustion engine of the power tool.

8. The device according to claim 3, further comprising an on/off switch for the electric signal, wherein the on/off switch is actuated by the operationally rotated part of the power tool.

9. The device according to claim 1, wherein the shut-off valve is a pneumatic valve, wherein the operationally rotated part generates a crankcase pressure of an internal combustion engine of the power tool, which crankcase pressure acts to actuate the pneumatic valve.

10. The device according to claim 9, wherein the pneumatic valve is a diaphragm valve.

11. The device according to claim 1, wherein the shut-off valve is a mechanical valve and wherein the operationally rotating part acts mechanically on the mechanical valve.

12. The device according to claim 11, wherein the mechanical valve is a centrifugal valve, wherein the operationally rotating part generates a centrifugal force.

13. The device according to claim 12, wherein the centrifugal valve is arranged in a hub of a cutting wheel of the power tool.

14. The device according to claim 13, wherein the centrifugal valve has an injection nozzle that is arranged in the area of the hub.

15. The device according to claim 1, wherein the valve arrangement further comprises a control valve having a valve body adjustable across a positioning travel, wherein an opening cross-section of the control valve has a progressive characteristic line depending on the positioning travel.

16. The device according to claim 15, wherein the progressive characteristic line comprises two at least approximately linearly extending portions that are angled progressively relative to one another.

17. The device according to claim 15, wherein the control valve is a globe valve and the positioning travel is linear.

18. The device according to claim 15, wherein the valve body is configured to have an opening action away from a rest position of the valve body that is neutral relative to an admission pressure of the water pressure at a supply side of the control valve.

19. The device according to claim 1, wherein the valve arrangement comprises a control valve and wherein the shut-off valve is connected flow-conductingly in series to the control valve, wherein the control valve is manually adjustable.

* * * * *